US008774817B2

(12) United States Patent
Chakraborty et al.

(10) Patent No.: US 8,774,817 B2
(45) Date of Patent: Jul. 8, 2014

(54) APPARATUS AND METHOD FOR HANDLING A CONNECTION REJECT MESSAGE

(75) Inventors: Supratim Chakraborty, Birmingham (GB); Andrew Farnsworth, Birmingham (GB)

(73) Assignee: BlackBerry Limited, Waterloo, Ontario (CA)

( * ) Notice: Subject to any disclaimer, the term of this patent is extended or adjusted under 35 U.S.C. 154(b) by 252 days.

(21) Appl. No.: 12/894,413

(22) Filed: Sep. 30, 2010

(65) Prior Publication Data
US 2011/0081887 A1 Apr. 7, 2011

Related U.S. Application Data

(60) Provisional application No. 61/248,366, filed on Oct. 2, 2009.

(51) Int. Cl.
*H04W 72/00* (2009.01)

(52) U.S. Cl.
USPC .......................................... 455/450; 370/329

(58) Field of Classification Search
USPC .............. 455/404.1, 410, 434–436, 445, 450; 370/329
See application file for complete search history.

(56) References Cited

U.S. PATENT DOCUMENTS

| 2004/0147266 | A1* | 7/2004 | Hwang et al. ................. 455/445 |
| 2004/0229626 | A1* | 11/2004 | Yi et al. ........................ 455/450 |
| 2007/0183427 | A1* | 8/2007 | Nylander et al. .......... 370/395.2 |
| 2007/0191010 | A1* | 8/2007 | Kim et al. ..................... 455/436 |
| 2008/0102784 | A1* | 5/2008 | Mittal et al. ................ 455/404.1 |
| 2010/0022250 | A1* | 1/2010 | Petrovic et al. .............. 455/450 |
| 2010/0075658 | A1* | 3/2010 | Hou et al. .................. 455/422.1 |
| 2010/0151859 | A1* | 6/2010 | Hsu .............................. 455/434 |
| 2010/0190499 | A1* | 7/2010 | Wu ............................... 455/436 |
| 2010/0216469 | A1* | 8/2010 | Yi et al. ..................... 455/435.3 |
| 2010/0302950 | A1* | 12/2010 | Zhao ............................ 370/242 |
| 2011/0019633 | A1* | 1/2011 | Tajima et al. ................ 370/329 |
| 2011/0053597 | A1* | 3/2011 | Lee et al. ..................... 455/436 |

OTHER PUBLICATIONS

3GPP TS 25.331 v9.0.0; 3rd Generation Partnership Project; Technical Specification Group Radio Access Network; Radio Resource Control (RRC); Protocol Specification; Release 9; Sep. 2009; 1710 pgs.

* cited by examiner

*Primary Examiner* — Jinsong Hu
*Assistant Examiner* — Nathan Taylor
(74) *Attorney, Agent, or Firm* — Conley Rose, P.C.; J. Robert Brown, Jr.

(57) ABSTRACT

There is provided a method, in a wireless communications device, the method comprising: receiving from a first RAT a reject message, the reject message indicating a period of time; camping on a cell of a second RAT; disallowing camping on a cell of the first RAT unless at least one of the following criteria are met: the period of time has elapsed; and the wireless communications device receives a further message indicating that the first RAT has confirmed it will accept a connection from the wireless communications device.

17 Claims, 8 Drawing Sheets

US 8,774,817 B2

APPARATUS AND METHOD FOR HANDLING A CONNECTION REJECT MESSAGE

CROSS-REFERENCE TO RELATED APPLICATIONS

The present application claims priority to U.S. provisional patent application No. 61/248,366 filed Oct. 2, 2009, by Supratim Chakraborty, et al, entitled "Apparatus and Method for Handling a Connection Reject Message", which is incorporated by reference herein as if reproduced in its entirety.

TECHNICAL FIELD

This application relates to mobile telecommunications systems in general, having particular application in UMTS (Universal Mobile Telecommunications System) in general, and in particular relates to an apparatus and method for handling a connection reject message.

DESCRIPTION OF THE RELATED ART

In a typical cellular radio system, mobile user equipment (UE) communicates via one or more radio access radio networks (RANs) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system.

A radio access network covers a geographical area typically divided into a plurality of cell areas. Each cell area is served by at least one base station, which in UMTS may be referred to as a Node B. Each cell is typically identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v8.7.0, referred to herein as the 25.331 specification, addresses the subject of UMTS RRC (Radio Resource Control) protocol requirements between the UMTS Terrestrial Radio Access Network (UTRAN) and the UE.

Section 8.1.3 of the 25.331 specification describes the establishment of an RRC connection between the UE and the UTRAN. The UE sends an RRC Connection Request message to the UTRAN. The UE will do this if it requires a signalling connection and does not presently have one. However, the UTRAN may not be able to accept the request for an RRC connection, in which case the UTRAN will reply with an RRC Connection Reject message. Section 8.1.3.9 of the 25.331 specification defines how a UE compliant with the standard must behave upon reception of an RRC Connection Reject message.

The RRC Connection Reject message may contain inter-RAT info pertaining to other Radio Access Technologies (RATs). The inter-RAT info defines a target system for redirected cell selection. The target system may be available to provide a radio connection to the UE. In accordance with section 8.1.3.9 of the 25.331 specification, upon receipt of a connection reject message containing inter-RAT info, the UE will camp on a cell of the indicated RAT. In order to prevent the UE from starting another attempt to camp on the UTRAN, cell reselection is disabled to the UTRAN until a wait time has elapsed. The wait time may be indicated by the UTRAN in the RRC Connection Reject message.

It has been identified that disabling cell reselection is not necessary in all circumstances of receipt of an RRC Connection Reject message. It has been further identified that disabling cell reselection is not sufficient to prevent the UE attempting to camp on the UTRAN.

There are thus proposed strategies for an apparatus and method for handling a connection reject message. A number of such strategies are detailed below.

Other aspects and features of the proposed strategy will become apparent to those ordinarily skilled in the art upon review of the following description of specific embodiments of an apparatus and method for handling a connection reject message.

BRIEF DESCRIPTION OF THE DRAWINGS

Embodiments will now be described, by way of example only, with reference to the attached drawings, in which.

DETAILED DESCRIPTION OF THE DRAWINGS

An apparatus and method for handling a connection reject message is described. In the following description, for the purposes of explanation, numerous specific details are set forth in order to provide a thorough understanding of the present invention. It will be apparent, however, to one skilled in the art that the technique may be practiced without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for handling a connection reject message. In other aspects, the invention encompasses apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

Figure 1:
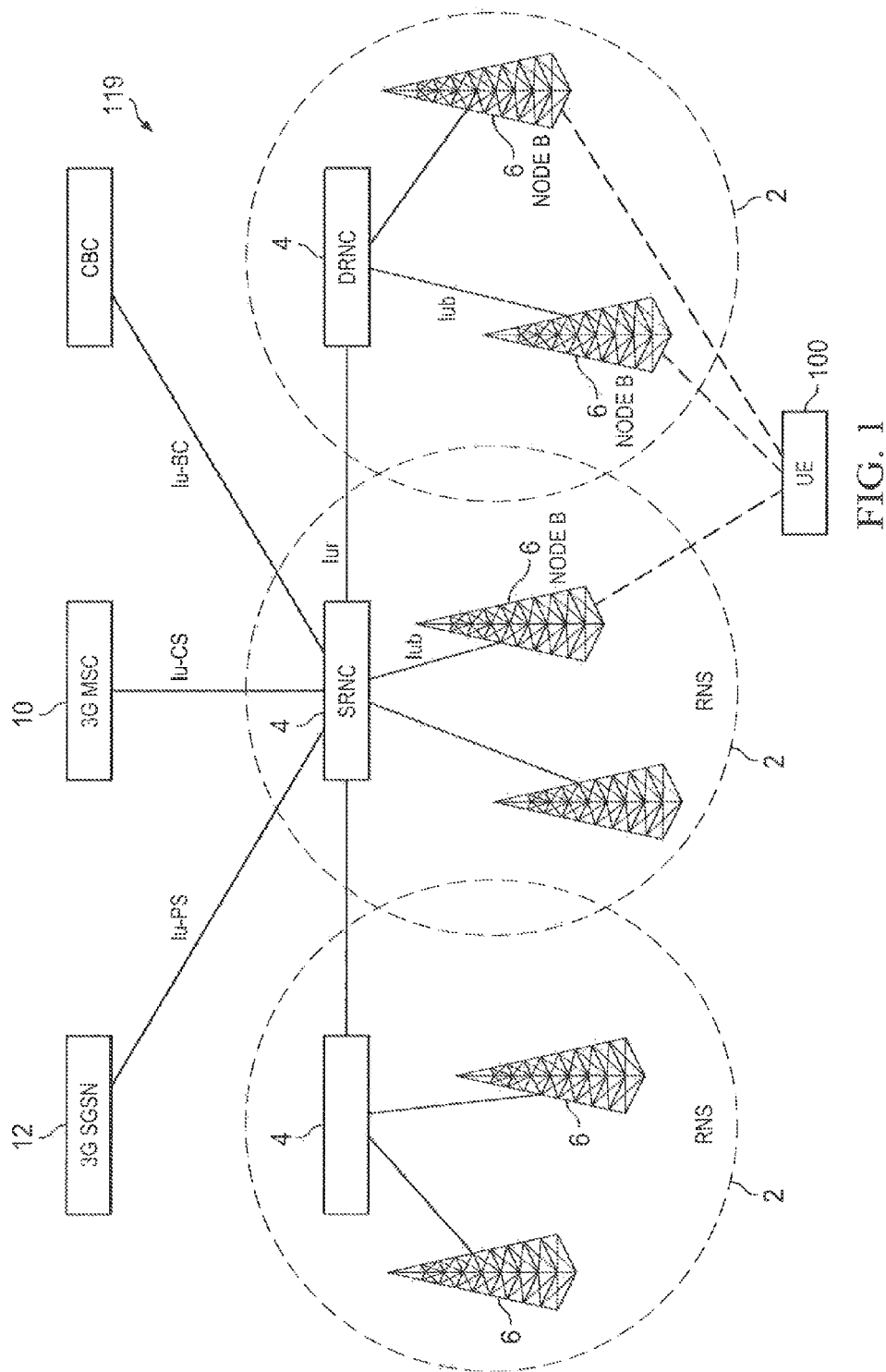
FIG. 1 shows an overview of a network and a user equipment device.

FIG. 1 shows an overview of a network and a UE device. Clearly in practice there may be many UE devices operating with the network but, for the sake of simplicity, FIG. 1 only shows a single UE device 100. For the purposes of illustration, FIG. 1 also shows a network 119 having a few components. It will be clear to a person skilled in the art that in practice a network will include far more components than those shown.

FIG. 1 shows an overview of the radio access network 119 (UTRAN) used in a UMTS system. The network 119 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 2:
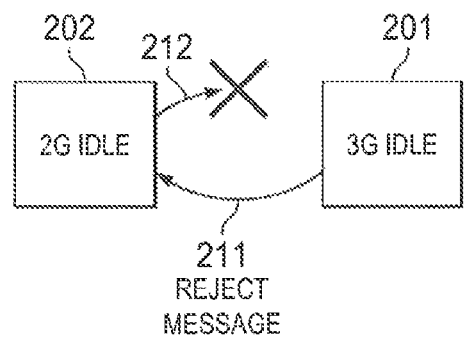
FIG. 2 illustrates a known message exchange in accordance with section 8.1.3.9 of the 25.331 specification.

FIG. 2 illustrates a known message exchange in accordance with section 8.1.3.9 of the 25.331 specification. A UE attempting to connect to the UTRAN and enter 3G idle state 201 receives a reject message 211. In response to a reject message 211 the UE camps on a 2G network such as GSM and enters 2G idle state 202. Where a wait time is indicated in the reject message 211, cell reselection 212 is disabled. Cell reselection 212 would allow the UE to transfer from 2G idle state 202 to 3G idle state 201.

Section 8.1.3.9 of the 25.331 specification also requires that after having selected and camped on a suitable cell on the designated RAT, the UE shall disable cell reselection to the original RAT until the wait time has elapsed or until the UE successfully establishes a connection on the designated RAT, whichever occurs first.

Figure 3:
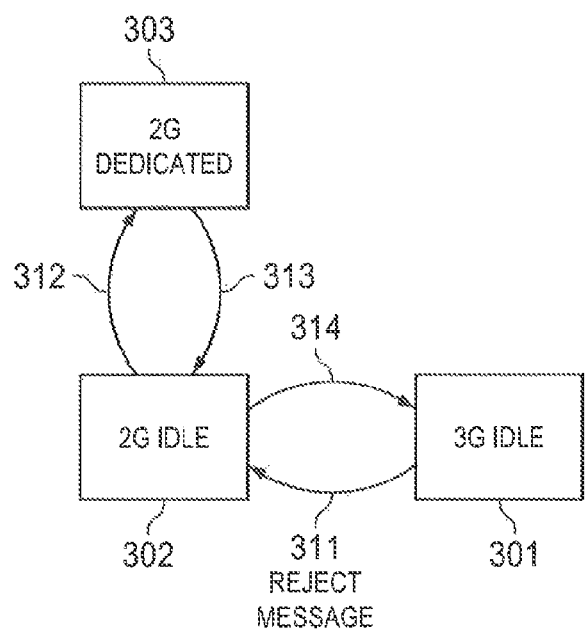
FIG. 3 illustrates cell reselection after a connection is established on the 2G network.

FIG. 3 illustrates cell reselection after a connection is established on the 2G network. A UE attempting to connect to a 3G network and enter 3G idle state 301 receives a reject message 311 and connects to a 2G network in 2G idle state 302. The UE may then establish 312 a dedicated connection in the 2G network and enter a 2G dedicated state 303. At this point, in accordance with the standard, the UE may enable cell reselection to the 3G network. When the dedicated resources are released the UE will close the 2G dedicated connection and transfer 311 to 2G idle state 302 at which it point it may, in accordance with the standard, attempt cell reselection 314 with the 3G network. A problem with this arrangement is that the wait time required by the 3G network may be, for example, 15 seconds. The dedicated resources in 2G dedicated state 303 may be required for only 2 seconds, for example. Such a short call could be a brief voice call but could alternatively be used to the send an email message. Accordingly, it is possible that a UE in accordance with the standard could reattempt cell reselection 314 with a 3G network prior to the expiry of the wait time and thus before the 3G network is able to provide a connection to the UE. Such a failed connection attempt wastes system resources, both in the network and the UE.

Figure 4:
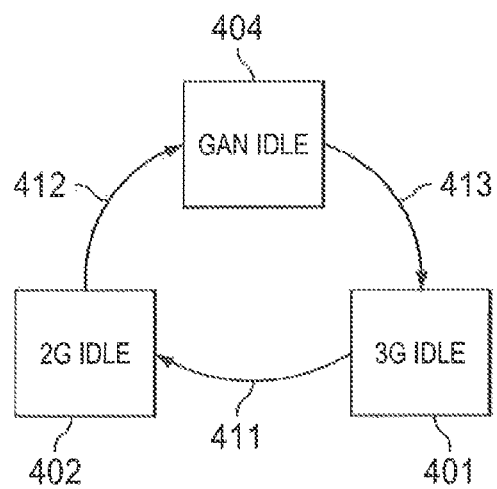
FIG. 4 illustrates a problem which may be encountered by a UE.

A further problem which may be encountered by a UE is illustrated in FIG. 4. A UE attempting to enter 3G idle state 401 receives a reject message 411 and enters 2G idle state 402. The UE may then rove in 412 to a Generic Access Network (GAN) and enter GAN idle state 404. The UE may subsequently rove out 413 of GAN idle state 404 and attempt to reconnect to the 3G network. The rove out 413 may be attempted during the wait time period given by the 3G network in the reject message 411. As such, the UE may attempt reconnection with the 3G network before the wait time has expired and while the 3G network is still experiencing congestion. This means it is likely the 3G network will reject the rove out 413 attempt by the UE. Such a failed connection attempt wastes system resources, both in the network and the UE.

Figure 5:
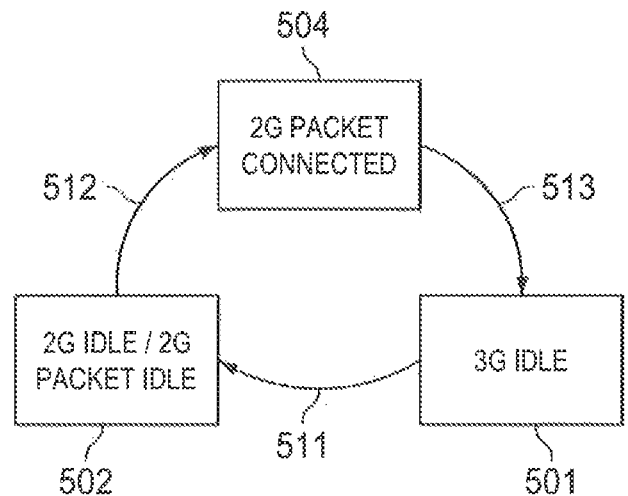
FIG. 5 shows a similar problem to that of FIG. 4.

FIG. 5 shows a similar problem to that of FIG. 4. A UE attempting to enter 3G idle state 501 receives a reject message 511 and enters either 2G idle state 502 or 2G packet idle state 502. The network may then assign 512 dedicated resources for transmitting a packet. This is known as temporary block flow. The UE will then move to a 2G packet-connected state 504. The UE may subsequently attempt to leave packet idle state 504 and attempt to reconnect 513 to the 3G network. The reconnection 513 may be facilitated by a cell change order message. The reconnection 513 may be attempted during the wait time period given by the 3G network in the reject message 511. As such, the UE may attempt reconnection with the 3G network before the wait time has expired and while the 3G network is still experiencing congestion. This means it is likely the 3G network will reject the connection attempt 513 by the UE. Such a failed connection attempt wastes system resources, both in the network and the UE.

Figure 6:
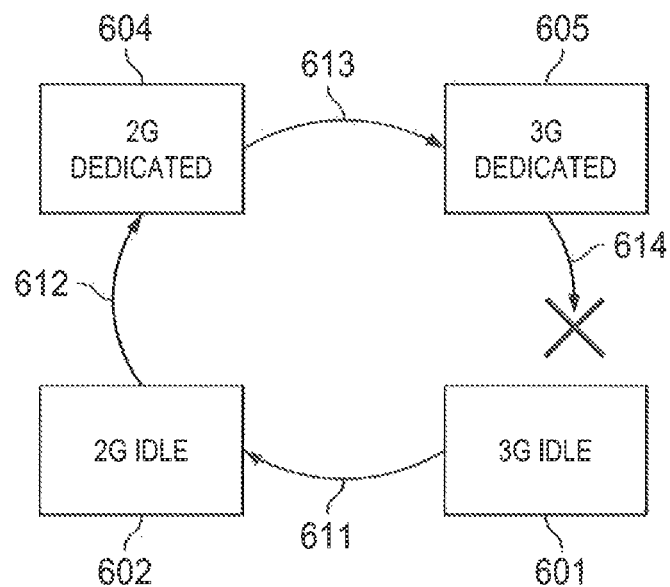
FIG. 6 illustrates a problem when cell reselection to 3G is incorrectly prevented by the standard.

FIG. 6 illustrates a problem when cell reselection to 3G is incorrectly prevented by the standard. A UE attempting to connect to 3G idle state 601 receives a connection reject message 611 and enters 2G idle state 602. The UE establishes a dedicated connection 612 in the 2G network and transfers from 2G idle state 602 to 2G dedicated state 604. The 2G network may negotiate a dedicated channel handover with the 3G network and transfer 613 the dedicated connection from the 2G network to the 3G network causing the UE to leave 2G dedicated state 604 and enter 3G dedicated state 605. When the dedicated connection is no longer required by the UE, it will terminate the connection and leave 3G dedicated state 605. At this time, the wait timer initiated by the connection reject message 611 may still be running even though the 3G network now has capacity to allow the UE to camp on it. Upon leaving 3G dedicated state 605, the UE would usually attempt to connect to 3G idle state 601. However, because the wait timer is still running cell reselection 614 to the 3G network is disallowed. Accordingly, the UE would be unduly prevented from connecting to the 3G network.

Figure 7:
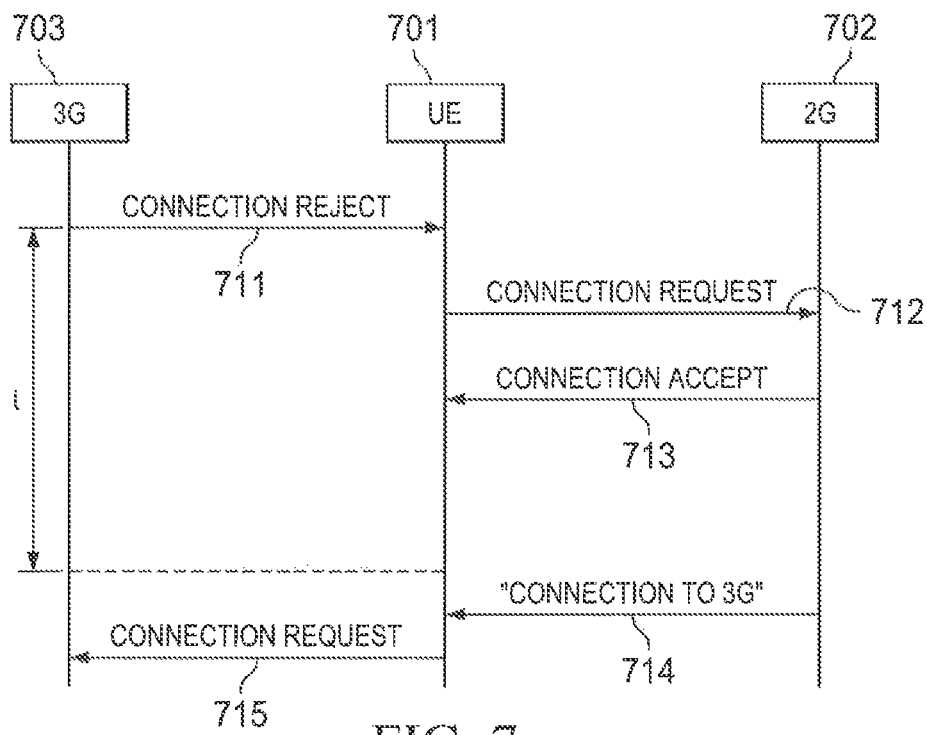
FIG. 7 illustrates a message exchange in accordance with the standard.

FIG. 7 illustrates a message exchange in accordance with the standard. A UE 701 receives a connection reject message 711 from the 3G network 703, such as a UTRAN. The connection reject message 711 indicates a wait time "t" during which cell reselection should not be reattempted with the 3G network 703. The UE 701 then sends a connection request message 712 to the 2G network 702 which responds with a connection accept message 713. Subsequently, the 2G network 702 instructs the UE 701 to connect to the 3G network 703 in a message 714. This is shown as being sent after the expiry of the wait time "t". In response message 714 the UE 701 sends a connection request message 715 to the 3G network 703. Because the wait time "t" has now expired the connection request message 715 is likely to be accepted by the UTRAN 703.

Figure 8:
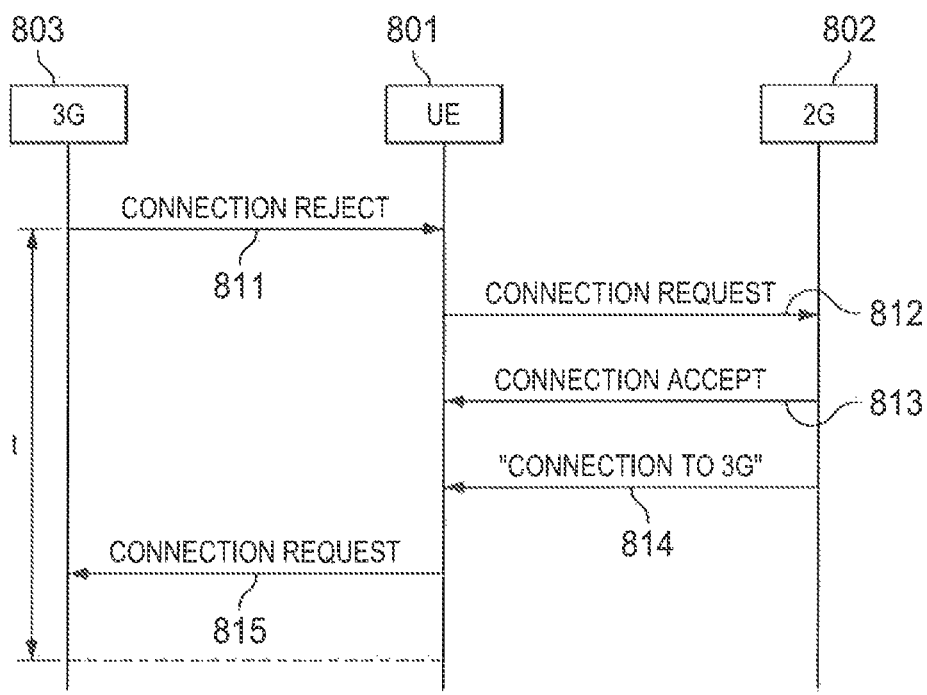
FIG. 8 illustrates a problem which may be encountered by a UE operating in accordance with the standard.

FIG. 8 illustrates a problem which may be encountered by a UE operating in accordance with the standard. A message exchange similar to that explained in FIG. 7 is shown in FIG. 8 except that the message 814 from the 2G network 802 to the UE 801 to connect to the 3G network 803, is sent prior to expiry of the wait time "t" causing the UE 801 to send a connection request message 815 to the UTRAN 803 before expiry of the wait time "t". Such a connection request 815 is likely to be rejected because the UTRAN 803 is still congested.

Figure 9:
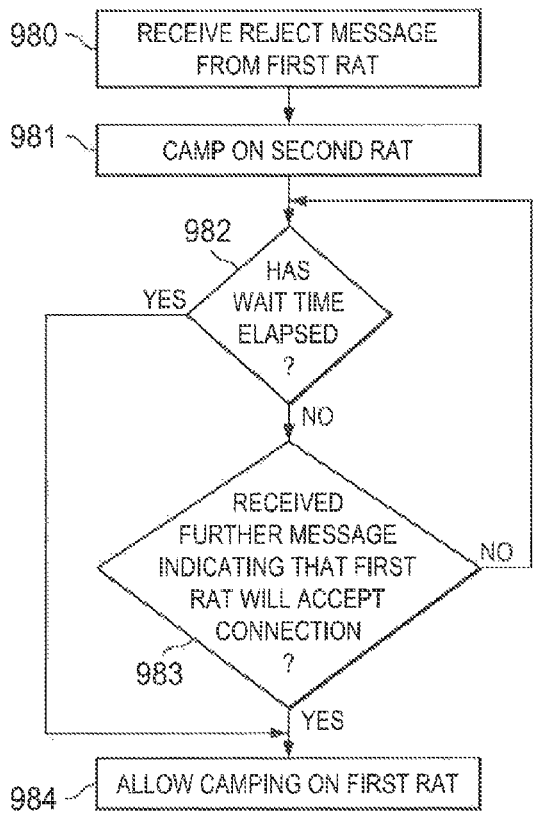
FIG. 9 shows a flow chart illustrating a method disclosed herein.

FIG. 9 shows a flow chart illustrating a method disclosed herein, the method directed towards addressing at least one of the above indicated problems. The method is implemented in a UE or other wireless communications device. The method may be implemented by one or more microprocessors in a UE or other wireless communications device. At box 980 the UE receives a reject message from a first RAT. In response thereto the UE camps on a cell of a second RAT; this is shown in box 981. At box 982 the UE determines whether a wait time has elapsed. Similarly, at box 983 the UE determines whether it has received a further message indicating that the first RAT has confirmed it can accept a connection from the UE. If either determination is positive then the UE allows camping on the first RAT, box 985. Unless at least one of the criteria shown in boxes 982 and 983 are met, the UE disallows camping on a cell of the first RAT.

In FIG. 9, determination 982 is shown as being formed prior to determination 983. It will be apparent that determination 983 could be performed before determination 982 such that if the result from 983 is negative then the determination of 982 is made. Furthermore, determinations 982 and 983 could be made in parallel. In any event, camping on a cell of the first RAT is disallowed unless at least one of determinations 982 and 983 is positive.

Disallowing camping on a cell of the first RAT may comprise: rejecting a cell change order to the first RAT; disallowing rove-out to first RAT (new); or disabling cell-reselection to the first RAT.

As will be explained below, the above described method prevents a UE from attempting to connect to a UTRAN prematurely yet allows a connection early when this is appropriate. Returning briefly to previously described FIGS. 2 to 8, it will be seen how the disclosed method performs this function.

In FIG. 2, cell reselection 212 is prevented by the disclosed method until the wait time has expired. In FIG. 3, the establishment of 2G dedicated connection by the UE at step 312 is not sufficient to allow cell reselection according to the disclosed method and as such cell reselection 314 as shown in FIG. 3 would not be allowed by the disclosed method. Accordingly, the disclosed method would prevent such a premature cell reselection to the UTRAN.

In FIG. 4, the move of UE from 2G idle state 402 to GAN idle state 404 is not sufficient to allow camping on the first RAT and accordingly the move 413 from GAN idle state 404 to 3G idle state 401 is prevented by the disclosed method, preventing premature reconnection requests being sent to the 3G network. Similarly, in FIG. 5, the move of UE from 2G idle state/2G packet idle state 502 to 2G packet connected state 504 is not sufficient to allow camping on the first RAT and accordingly the move 513 from 2G packet connected state 504 to 3G idle state 501 is prevented by the disclosed method, again preventing premature reconnection requests being sent to the 3G network.

In FIG. 6, the transfer of the dedicated connection 613 allowing the UE to transition from 2G dedicated state 604 to 3G dedicated state 605 constitutes an indication that the first RAT would accept a connection from the UE and as such a positive determination is made at box 983 of FIG. 9, and camping on the first RAT is allowed, box 985. As such, cell reselection 614 from 3G connected state 602 to 3G idle state 601 is advantageously allowed according to the disclosed method.

The message exchange illustrated in FIG. 7 is not affected by the disclosed method because the wait time "t" has expired when the UE 701 receives the connect to 3G order 714 from the 3G network 702. Thus, the connection request 715 may be sent from the UE 701 to the 3G network 703. However, the connection request 815 of FIG. 8 would be prevented by a UE operating according to the disclosed method because neither determination 982, 983 have been positively satisfied when message 814 is received.

Figure 10:
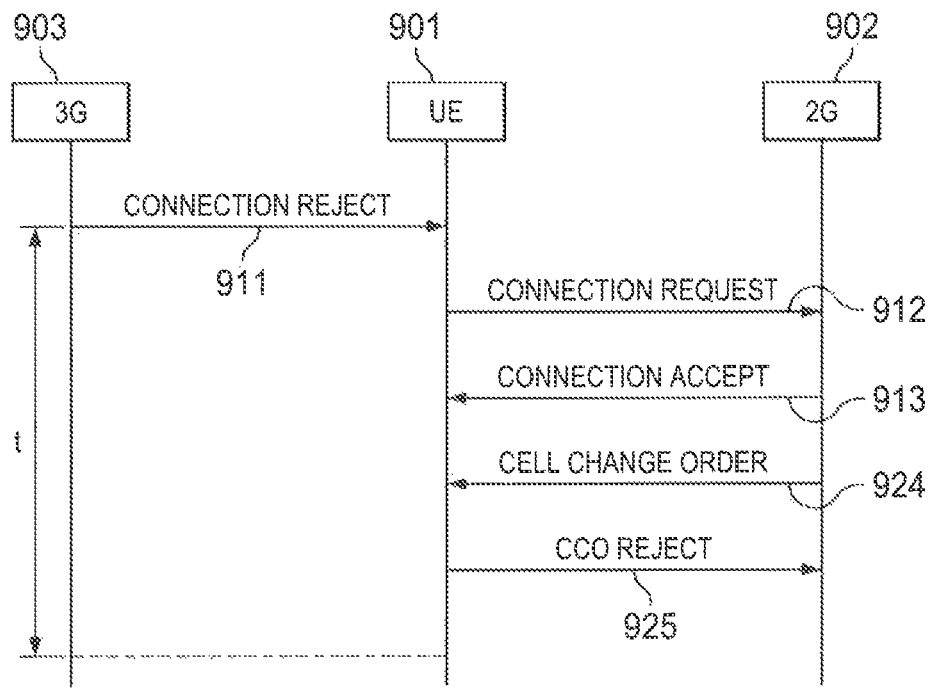
FIG. 10 illustrates a cell change order message being handled according to the method disclosed herein.

FIG. 10 illustrates a cell change order message being handled according to the method disclosed herein. UE 901 receives a connection reject message 911 from UTRAN 903 which initiates a wait time "t". UE 901 sends a connection request message 912 to a 2G network 902 and in response thereto receives a connection accept message 913. Subsequently, 2G network 902 sends a cell change order message 924 to UE 901. The cell change order message 924 allows the 2G network 902 to indicate a transfer of the connections of the UE 901 to another network, such as the 3G network 903. In FIG. 10, the cell change order 924 is received by the UE 901 prior to the expiry of the wait time "t", and further the cell change order 924 does not constitute an indication that the 3G network 903 has confirmed it will accept a connection from the UE 901. Accordingly, the determinations 982 and 983 are negative and the UE 901 rejects the cell change order at 925. Cell change order 924 is usually sent from 2G 902 to UE 901 when no indication has been made by UTRAN 903 that it will accept a connection from the UE 901. It should be noted that cell change order 924 may be sent from 2G 902 to UE 901 after an indication has been made by UTRAN 903 that it will accept a connection from the UE 901, but the cell change order message 924 received by the UE 901 does not provide such an indication.

The method disclosed herein means that the UE will not attempt to select a cell on the UTRAN, as per the received cell change order, until the expiry of the wait time "t". If the UE were to attempt to select a cell on the UTRAN prior to expiry of the wait time then there is chance of congestion still existing in the UTRAN (the likely reason for the connection reject message being sent in the first place). The UE camping or attempting to camp on the UTRAN will contribute to the traffic being handled by the UTRAN and will add to any existing congestion and thus may reduce performance of both the UE and the UTRAN.

Figure 11:
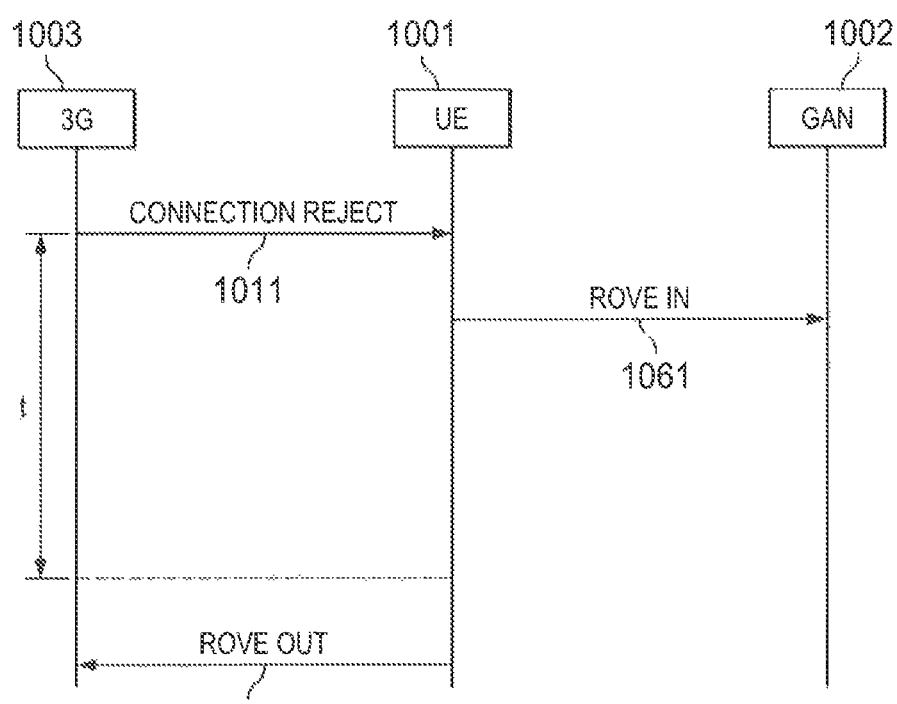
FIG. 11 shows UE receiving a connection reject message from 3G network.

FIG. 11 shows UE 1001 receiving a connection reject message 1011 from 3G network 1003. The connection reject message 1011 initiates a wait time "t". UE 1001 subsequently roves in 1061 to a GAN 1002. According to the method disclosed herein, the UE 1001 may not rove out 1062 from GAN 1002 until the wait time "t" has elapsed.

Figure 12:
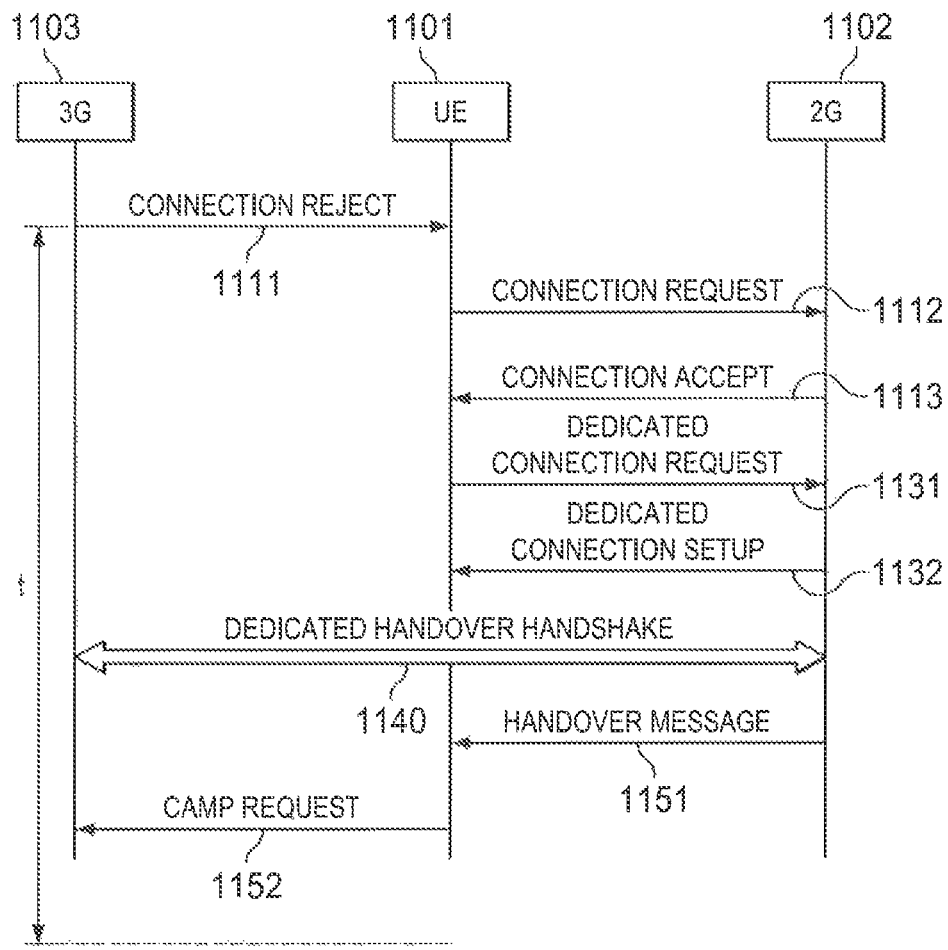
FIG. 12 shows a message exchange including a dedicated handover handshake between a 2G network and a 3G network.

FIG. 12 shows a message exchange including a dedicated handover handshake between a 2G network 1102 and a 3G network 1103. UE 1101 receives a connection reject message 1111 from 3G network 1103. In response thereto UE 1101 sends a connection request message 1112 to the 2G network 1102 and in response thereto receives a connection accept message 1113. UE 1101 subsequently sets up a dedicated connection to the 2G network 1102 by sending a dedicated connection request message 1131 and receiving a dedicated connection set up message 1132. While the dedicated connection is in effect, 2G network 1102 initiates an inter-RAT handover to 3G network 1103 and as part of the inter-RAT handover performs a dedicated connection handover handshake 1140. 2G network 1102 then sends a handover message 1151 to UE 1101. This handover message 1151 constitutes an indication that the first RAT has confirmed it will accept a connection from the UE 1101 and as such determination 983 is positive such the UE 1101 may send a camp request 1152 to 3G network 1103 even though wait time "t" has not yet expired and determination 982 is negative.

Figure 13:
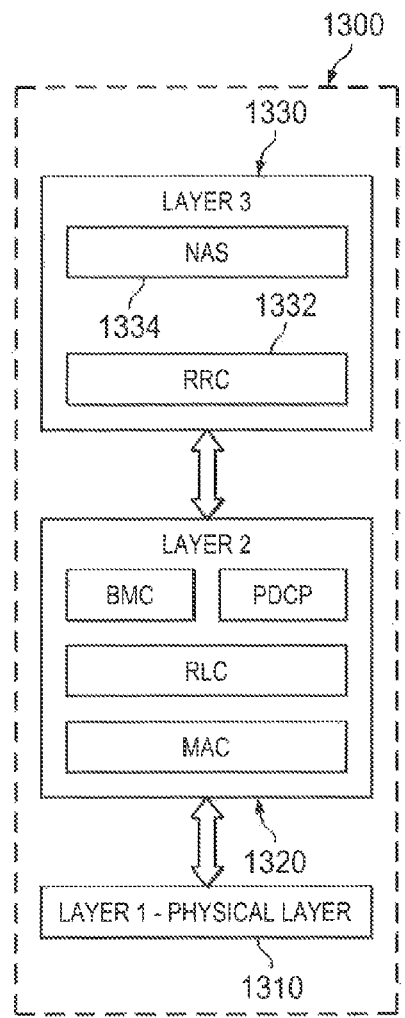
FIG. 13 is a block diagram illustrating an embodiment of a protocol stack apparatus provided with a RRC block, in accordance with the present application.

FIG. 13 is a block diagram illustrating an embodiment of a protocol stack provided in a UE. A Radio Resource Controller (RRC) block 1332 is a sub layer of Layer 3 1330 of a UMTS protocol stack 1300. The RRC 1332 exists in the control plane only and provides an information transfer service to the non-access stratum NAS 1334. The RRC 1332 is responsible for controlling the configuration of radio interface Layer 1 1310 and Layer 2 1320. When the UTRAN wishes to change the UE configuration it will issue a message to the UE containing a command to invoke a specific RRC procedure. The RRC layer 1332 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for handling a connection reject message as discussed above with reference to the drawings may be implemented by the RRC block 1332.

Figure 14:
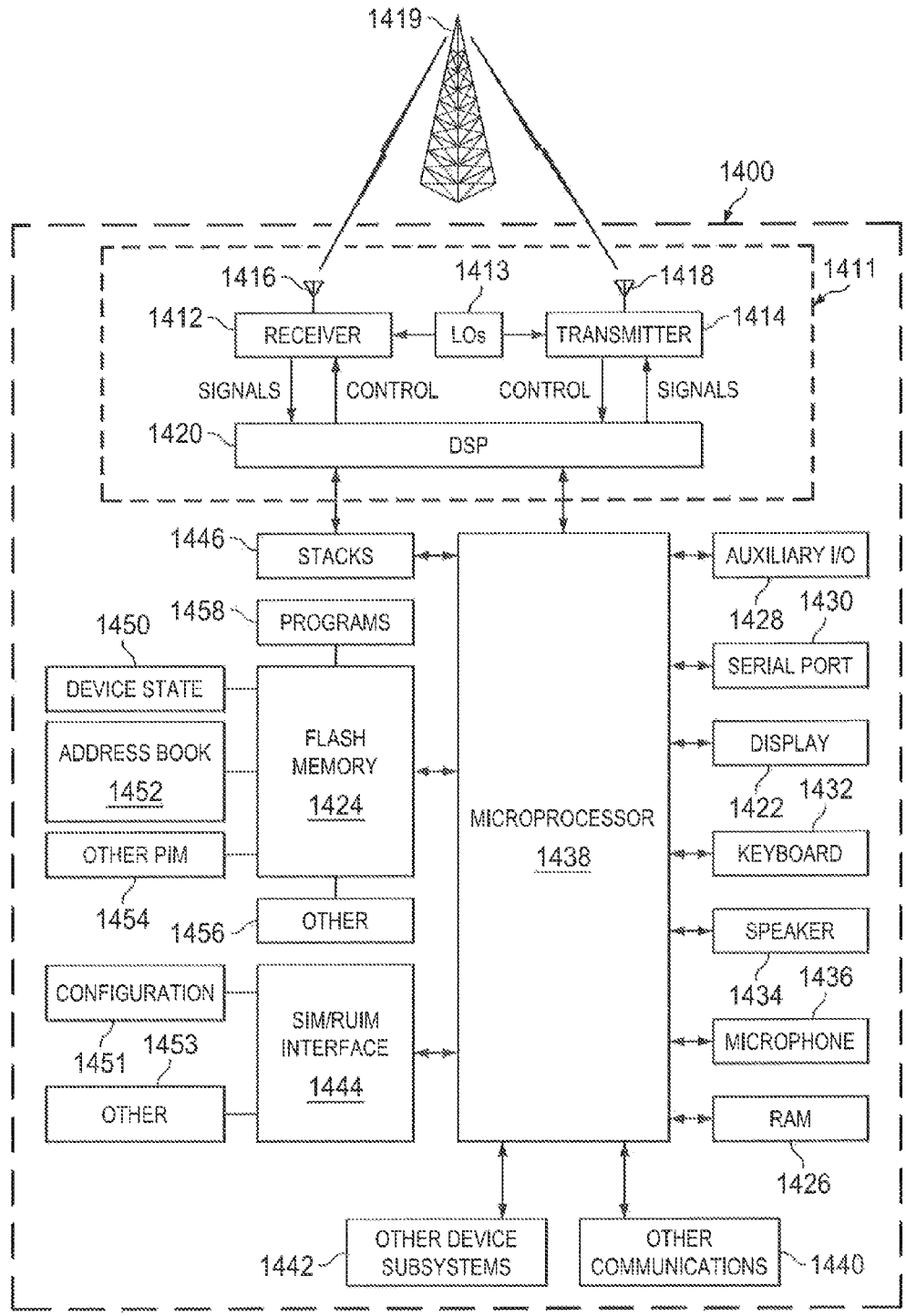
FIG. 14 is a block diagram illustrating a mobile device, which can act as a UE and co-operate with the apparatus and methods of FIGS. 1 to 13.

Turning now to FIG. 14, FIG. 14 is a block diagram illustrating a mobile device, which can act as a UE and co-operate with the apparatus and methods of FIGS. 1 to 13 and which is an exemplary wireless communication device. Mobile station 1400 is preferably a two-way wireless communication device having at least voice and data communication capabilities. Mobile station 1400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 1400 is enabled for two-way communication, it will incorporate a communication subsystem 1411, including both a receiver 1412 and a transmitter 1414, as well as associated components such as one or more, preferably embedded or internal, antenna elements 1416 and 1418, local oscillators (LOs) 1413, and processing means such as a processing module such as a digital signal processor (DSP) 1420. As will be apparent to those skilled in the field of communications, the particular design of the communication subsystem 1411 will be dependent upon the communication network in which the device is intended to operate. For example, mobile station 1400 may include a communication subsystem 1411 designed to operate within the Mobitex™ mobile communication system, the DataTAC™ mobile communication system, GPRS network, UMTS network, or EDGE network.

Network access requirements will also vary depending upon the type of network 1402. For example, in the Mobitex and DataTAC networks, mobile station 1400 is registered on the network using a unique identification number associated with each mobile station. In UMTS and GPRS networks, however, network access is associated with a subscriber or user of mobile station 1400. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 1400 will be unable to carry out any other functions involving communications over the network 1402. The SIM interface 1444 is normally similar to a card-slot into which a SIM card can be inserted and ejected like a diskette or PCMCIA card. The SIM card can have approximately 64K of memory and hold many key configuration 1451, and other information 1453 such as identification, and subscriber related information.

When required network registration or activation procedures have been completed, mobile station 1400 may send and receive communication signals over the network 1402. Signals received by antenna 1416 through communication network 1402 are input to receiver 1412, which may perform such common receiver functions as signal amplification, frequency down conversion, filtering, channel selection and the like, and in the example system shown in FIG. 14, analog to digital (A/D) conversion. A/D conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog conversion, frequency up conversion, filtering, amplification and transmission over the communication network 1402 via antenna 1418. DSP 1420 not only processes communication signals, but also provides for receiver and transmitter control.

For example, the gains applied to communication signals in receiver 1412 and transmitter 1414 may be adaptively controlled through automatic gain control algorithms implemented in DSP 1420.

Mobile station 1400 preferably includes processing means such as a microprocessor 1438 which controls the overall operation of the device. Communication functions, including at least data and voice communications, are performed through communication subsystem 1411. Microprocessor 1438 also interacts with further device subsystems such as the display 1422, flash memory 1424, random access memory (RAM) 1426, auxiliary input/output (I/O) subsystems 1428, serial port 1430, keyboard 1432, speaker 1434, microphone 1436, a short-range communications subsystem 1440 and any other device subsystems generally designated as 1442.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the microprocessor 1438 is preferably stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Microprocessor 1438, in addition to its operating system functions, preferably enables execution of software applications on the mobile station. A predetermined set of applications that control basic operations, including at least data and voice communication applications for example, will normally be installed on mobile station 1400 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1402. In a preferred embodiment, the PIM data items are seamlessly integrated, synchronized and updated, via the wireless network 1402, with the mobile station user's corresponding data items stored or associated with a host computer system. Further applications may also be loaded onto the mobile station 1400 through the network 1402, an auxiliary I/O subsystem 1428, serial port 1430, short-range communications subsystem 1440 or any other suitable subsystem 1442, and installed by a user in the RAM 1426 or preferably a non-volatile store (not shown) for execution by the microprocessor 1438. Such flexibility in application installation increases the functionality of the device and may provide enhanced on-device functions, communication-related functions, or both. For example, secure communication applications may enable electronic commerce functions and other such financial transactions to be performed using the mobile station 1400.

In a data communication mode, a received signal such as a text message or web page download will be processed by the communication subsystem 1411 and input to the microprocessor 1438, which preferably further processes the received signal for output to the display 1422, or alternatively to an auxiliary I/O device 1428. A user of mobile station 1400 may also compose data items such as email messages for example, using the keyboard 1432, which is preferably a complete alphanumeric keyboard or telephone-type keypad, in conjunction with the display 1422 and possibly an auxiliary I/O device 1428. Such composed items may then be transmitted over a communication network through the communication subsystem 1411.

For voice communications, overall operation of mobile station 1400 is similar, except that received signals would preferably be output to a speaker 1434 and signals for transmission would be generated by a microphone 1436. Alternative voice or audio I/O subsystems, such as a voice message recording subsystem, may also be implemented on mobile station 1400. Although voice or audio signal output is preferably accomplished primarily through the speaker 1434, display 1422 may also be used to provide an indication of the identity of a calling party, the duration of a voice call, or other voice call related information for example.

Serial port 1430 in FIG. 14, would normally be implemented in a personal digital assistant (PDA)-type mobile station for which synchronization with a user's desktop computer (not shown) may be desirable, but is an optional device component. Such a port 1430 would enable a user to set preferences through an external device or software application and would extend the capabilities of mobile station 1400 by providing for information or software downloads to mobile station 1400 other than through a wireless communication network. The alternate download path may for example be used to load an encryption key onto the device through a direct and thus reliable and trusted connection to thereby enable secure device communication.

Other communications subsystems 1440, such as a short-range communications subsystem, is a further optional component which may provide for communication between mobile station 1400 and different systems or devices, which need not necessarily be similar devices. For example, the subsystem 1440 may include an infrared device and associated circuits and components or a Bluetooth™ communication module to provide for communication with similarly enabled systems and devices.

When mobile device 1400 is used as a UE, protocol stacks 1446 include apparatus and a method for handling a connection reject message.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method, in a wireless communications device, the method comprising:
   receiving from a first radio access technology (RAT) a reject message, the reject message indicating a period of time;
   camping on a cell of a second RAT;
   disallowing camping on a cell of the first RAT until the period of time has elapsed, and in response to the period of time elapsing: allowing camping on the cell of the first RAT;
   unless in the period of time the wireless communications device receives a further message indicating that the first RAT has confirmed it will accept a connection from the wireless communication device, when in response to receipt of the message: allowing camping on the cell of the first RAT;
   wherein the method further comprising determining whether the further message is valid; and
   wherein the reject message includes a pointer to the value of the period of time, the value of the period of time previously stored in the wireless communications device.

2. The method of claim 1, wherein disallowing camping on a cell of the first RAT comprises:
   rejecting a cell change order to the first RAT;
   disallowing rove-out to first RAT; and
   disabling cell-reselection to the first RAT.

3. The method of claim 1, wherein the further message is at least one of:
   a handover complete message; and
   a handover request message.

4. The method of claim 1, wherein the period of time indicated by the reject message is a period of time during which the wireless communications device should wait before attempting to connect to the first RAT.

5. The method of claim 1, wherein the reject message includes the value of the period of time.

6. The method of claim 1, wherein the first RAT is Universal Mobile Telecommunications System (UMTS) and the reject message is an RRC Connection Reject Message.

7. The method of claim 1, wherein the second RAT is one of a Global System for Mobile Communications (GSM) network and a Generic Access Network (GAN).

8. The method of claim 1, wherein the reject message indicates the second RAT.

9. A wireless communications device comprising:
   a transceiver for transmitting and receiving radio signals;
   a processor; and
   a memory having stored therein: one or more routines executable by the processor, the one or more routines being adapted to:
   receive from a first RAT a reject message, the reject message indicating a period of time;
   camp on a cell of a second RAT;
   disallow camping on a cell of the first RAT until the period of time has elapsed, and in response to the period of time elapsing: allow camping on the cell of the first RAT;
   unless in the period of time the wireless communications device receives a further message indicating that the first RAT has confirmed it will accept a connection from the wireless communication device, when in response to receipt of the further message: allow camping on the cell of the first RAT;
   determine whether the further message is valid; and
   wherein the reject message includes a pointer to the value of the period of time, the value of the period of time previously stored in the wireless communications device.

10. The wireless communications device of claim 9, wherein disallowing camping on a cell of the first RAT comprises:
    rejecting a cell change order to the first RAT;
    disallowing rove-out to first RAT; and
    disabling cell-reselection to the first RAT.

11. The wireless communications device of claim 9, wherein the further message is at least one of:
    a handover complete message; and
    a handover request message.

12. The wireless communications device of claim 9, wherein the period of time indicated by the reject message is a period of time during which the wireless communications device should wait before attempting to connect to the first RAT.

13. The wireless communications device of claim 9, wherein the reject message includes the value of the period of time.

14. The wireless communications device of claim 9, wherein the first RAT is UMTS and the reject message is an Radio Resource Control (RRC) Connection Reject Message.

15. The wireless communications device of claim 9, wherein the second RAT is one of a Global System for Mobile Communications (GSM) network and a Generic Access Network (GAN).

16. The wireless communications device of claim 9, wherein the reject message indicates the second RAT.

17. A non-transitory computer-readable storage medium having computer-executable instructions encoded thereon, the computer-executable instructions adapted to cause a wireless communications device to:
   receive from a first RAT a reject message, a reject message indicating a period of time;
   camp on a cell of a second RAT;
   disallow camping on a cell of the first RAT until the period of time has elapsed, and in response to the period of time elapsing: allow camping on the cell of the first RAT;
   unless in the period of time the wireless communications device receives a further message indicating that the first RAT has confirmed it will accept a connection from the wireless communication device, when in response to receipt of the further message: allow camping on the cell of the first RAT;
   determine whether the further message is valid; and
   wherein the reject message includes a pointer to the value of the period of time, the value of the period of time previously stored in the wireless communications device.

* * * * *